(12) United States Patent
Keyes, IV et al.

(10) Patent No.: US 7,447,612 B2
(45) Date of Patent: *Nov. 4, 2008

(54) APPENDABLE SYSTEM AND DEVICES FOR DATA ACQUISITION, ANALYSIS AND CONTROL

(75) Inventors: Marion A. Keyes, IV, St. Louis, MO (US); Trevor D. Schleiss, Austin, TX (US); Ron Eddie, Austin, TX (US); Mark Nixon, Round Rock, TX (US); Terrence L. Blevins, Round Rock, TX (US); Ram Ramachandran, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 11/361,772

(22) Filed: Feb. 24, 2006

(65) Prior Publication Data

US 2006/0142875 A1    Jun. 29, 2006

Related U.S. Application Data

(63) Continuation of application No. 10/091,805, filed on Mar. 6, 2002, now Pat. No. 7,035,773.

(51) Int. Cl.
*G06F 11/00* (2006.01)
*G06F 15/00* (2006.01)
*G06F 19/00* (2006.01)
*G06F 11/30* (2006.01)
*G01M 19/00* (2006.01)
*G21C 17/00* (2006.01)
*G05B 11/01* (2006.01)
*G05B 23/02* (2006.01)

(52) U.S. Cl. .............. 702/188; 702/122; 702/183; 700/19; 700/20; 340/310.11; 340/3.1

(58) Field of Classification Search .......... 700/11, 700/17, 19, 20, 65–67, 83; 702/122, 182, 702/183, 188; 340/310.01, 310.11, 825.22, 340/3.1, 3.9; 318/490; 73/570, 649, 658, 73/661

See application file for complete search history.

(56) References Cited

U.S. PATENT DOCUMENTS 4,704,607 A * 11/1987 Teather et al. .............. 340/3.71

(Continued)

FOREIGN PATENT DOCUMENTS

CN    87206654 U    12/1988

(Continued)

OTHER PUBLICATIONS

Search Report under Section 17 issued in GB 0525474.3 application by the United Kingdom Patent Office dated Mar. 28, 2006.

(Continued)

*Primary Examiner*—Crystal Barnes Bullock
(74) *Attorney, Agent, or Firm*—Marshall, Gerstein & Borun LLP

(57) ABSTRACT

An appendable system includes a plurality of appendable devices that are adapted to interoperate with each other and/or a workstation via a communication network to monitor and/or control a process. Each of the appendable devices can communicate with one or more sensors and/or control outputs and includes a housing that facilitates mounting of the appendable device to a surface.

20 Claims, 3 Drawing Sheets

U.S. PATENT DOCUMENTS

| | | | |
|---|---|---|---|
| 4,763,284 A | | 8/1988 | Carlin |
| 5,170,002 A | | 12/1992 | Suzuki et al. |
| 5,481,481 A | | 1/1996 | Frey et al. |
| 5,619,192 A | * | 4/1997 | Ayala ................ 340/870.02 |
| 5,741,966 A | * | 4/1998 | Handfield et al. ......... 73/146.5 |
| 5,747,786 A | | 5/1998 | Cargin et al. |
| 5,841,255 A | | 11/1998 | Canada et al. |
| 5,884,202 A | | 3/1999 | Arjomand |
| 6,014,612 A | | 1/2000 | Larson et al. |
| 6,076,124 A | | 6/2000 | Korowitz et al. |
| 6,094,609 A | | 7/2000 | Arjomand |
| 6,144,993 A | | 11/2000 | Fukunaga et al. |
| 6,241,673 B1 | | 6/2001 | Williams |
| 6,352,504 B1 | | 3/2002 | Ise et al. |
| 6,496,695 B1 | | 12/2002 | Kouji et al. |
| 6,535,112 B1 | | 3/2003 | Rothschink |
| 6,600,409 B2 | * | 7/2003 | Cohen .................... 340/425.5 |
| 6,605,046 B1 | | 8/2003 | Del Mar |
| 6,714,977 B1 | * | 3/2004 | Fowler et al. ............. 709/224 |
| 6,735,450 B1 | | 5/2004 | Remmert |
| 6,741,174 B2 | * | 5/2004 | Rhoades et al. ............ 340/540 |
| 6,782,240 B1 | * | 8/2004 | Tabe ....................... 455/66.1 |
| 7,092,785 B2 | * | 8/2006 | Alsio et al. ................ 700/168 |
| 7,092,988 B1 | * | 8/2006 | Bogatin et al. ............. 709/203 |
| 7,137,964 B2 | * | 11/2006 | Flaherty ...................... 604/67 |
| 7,174,176 B1 | * | 2/2007 | Liu .......................... 455/462 |
| 7,224,642 B1 | * | 5/2007 | Tran ............................ 367/77 |
| 7,285,090 B2 | * | 10/2007 | Stivoric et al. ............. 600/300 |
| 2002/0019712 A1 | | 2/2002 | Petite et al. |
| 2002/0042266 A1 | | 4/2002 | Heyward et al. |
| 2002/0050932 A1 | | 5/2002 | Rhoades et al. |
| 2004/0087894 A1 | | 5/2004 | Flaherty |
| 2004/0152957 A1 | | 8/2004 | Stivoric et al. |
| 2005/0071498 A1 | | 3/2005 | Farchmin |
| 2005/0092880 A1 | | 5/2005 | Lutze et al. |
| 2005/0201397 A1 | | 9/2005 | Petite |
| 2006/0269216 A1 | * | 11/2006 | Wiemeyer et al. .......... 385/147 |

FOREIGN PATENT DOCUMENTS

| | | |
|---|---|---|
| CN | 2074954 U | 4/1991 |
| CN | 1110797 A | 10/1995 |
| CN | 1188267 A | 7/1998 |
| CN | 1304487 A | 7/2001 |
| EP | 0 332 607 A2 | 9/1989 |
| JP | 09-167199 | 6/1997 |
| WO | WO-01/73219 | 10/2001 |
| WO | WO 02/05199 | 1/2002 |

OTHER PUBLICATIONS

Examination Report under Section 18(3) issued in GB 0525474.3 application by the United Kingdom Patent Office dated Mar. 29, 2006.

Networker, "TS790/TS900 10-56 Zone Intruder Alarm Control Panels, Installation & Programming Manual," Issue 03, pp. 1-18.

Search Report under Section 17 issued in GB 0305124.0 application by the United Kingdom Patent Office on Aug. 28, 2003.

Examination Report under Section 18(3) issued in GB0305124.0 application by the United Kingdom Patent Office on Jan. 14, 2005.

Examination Report under Section 18(3) issued in GB0305124.0 application by the United Kingdom Patent Office on Aug. 10, 2005.

Examination Report under Section 18(3) issued in GB0305124.0 application by the United Kingdom Patent Office on Dec. 19, 2005.

Notice of First Office Action issued in corresponding Chinese Application No. 03120252.7, dated May 11, 2007.

Notice of the Reasons for Rejection for Application No. JP 2003-107115, dated Jul. 12, 2007.

Notice of the Reasons for Rejection for Application No. JP 2003-107115, dated Feb. 12, 2008.

* cited by examiner

APPENDABLE SYSTEM AND DEVICES FOR DATA ACQUISITION, ANALYSIS AND CONTROL

RELATED APPLICATION

This application is a continuation of U.S. patent application Ser. No. 10/091,805 filed Mar. 6, 2002, entitled "Appendable System and Devices for Data Acquisition, Analysis and Control," the entire disclosure of which is hereby incorporated by reference herein.

FIELD OF THE INVENTION

The present invention relates generally to process control systems and, more specifically, to a system and devices that may be appended or attached to process control equipment and/or other entities to perform data acquisition activities, data analysis activities and/or process control activities.

DESCRIPTION OF THE RELATED ART

Modern process control systems are typically microprocessor-based distributed control systems (DCSs). A traditional DCS configuration includes one or more user interface devices, such as workstations, connected by a databus (e.g., Ethernet) to one or more controllers. The controllers are generally located physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on smart field devices that communicate using an open protocol such as the HART®, PROFIBUS®, WORLDFIP®, Device-Net®, CAN, and Fieldbus protocols. These smart field devices are essentially microprocessor-based devices such as sensors, actuators, etc. that, in some cases, such as with Fieldbus devices, also perform some control loop functions traditionally executed by a DCS controller. Because some smart field devices provide control capability and communicate using an open protocol, field devices from a variety of manufacturers can communicate with each other on a common digital databus and can interoperate to execute a control loop without the intervention of a traditional DCS controller.

As is well known, smart field devices such as, for example, Fieldbus devices, may include one or more logical function blocks that perform control functions or portions of a control function. These function blocks may, for example, perform analog input functions, analog output functions, proportional-integral-derivative (PID) control functions, or any other desired control functions. The function blocks within a smart field device may be communicatively linked with other function blocks within that smart field device or with function blocks within other smart field devices to carry out any desired control function. For example, an analog input block may be used to monitor a fluid flow via a flow sensor and a PID block may process a fluid flow value provided by the analog input block to provide responsive signals via an analog output block to an actuator that modulates the position of a valve plug. Thus, these function blocks may be communicatively linked to one another to form a PID-based control loop that controls the flow of a fluid through a valve.

As is also well known, smart field devices facilitate the design and configuration of relatively large process control systems by enabling system designers and operators to design and configure a large process control system in a hierarchical, modular or building block fashion. In other words, relatively small portions of the overall process control system can be designed and configured separately and linked together to form larger portions of the overall system. However, once implemented and operational, a process control system that uses smart field devices may be relatively difficult to reconfigure or modify because the smart field devices are typically physically integrated with the equipment, sensors, etc. used throughout the process control system or plant. For example, a smart water valve may have water pipes connected to its input and output ports via threaded engagements, solder, etc. and may have electrical conduits connected to it that encase wires, which may provide power and convey other signals associated with the monitoring and control of the valve. Similarly, a smart temperature sensor may have a temperature probe portion that is threaded into an immersion well within a water pipe, a tank, or any other piece of equipment within the process control system. The smart temperature sensor may also have an electrical conduit connected to it that encases power and/or other signal carrying wires extending from the temperature sensor to other devices such as, for example, a controller or any other device within the process control system or plant.

Although the high degree of physical integration typically found within process control systems that employ smart field devices provides a high degree of mechanical and electrical integrity, such systems are relatively expensive to install and commission because their installation typically requires significant amounts of trade labor (e.g., electricians, plumbers, etc.). Furthermore, the high degree of mechanical integration also typically requires the process control equipment used within the system or plant to provide mechanical interfaces that enable attachment of the smart field devices needed to monitor and/or control the equipment. In some cases, a mechanical interface provided by the equipment manufacturer may have to be modified in the field by an appropriate tradesperson to enable installation of the smart field device. In still other cases, the equipment manufacturer may not provide any mechanical interface and a tradesperson may have to fabricate an appropriate interface in the field. In either case, a significant amount of labor and cost is typically incurred as a result of having to mechanically integrate the smart field devices within the process control plant or system.

Another difficulty associated with adding smart field devices or, more generally, a monitoring and/or automation system, to a process or plant that does not currently have any such devices, is that these systems typically lack the necessary electrical (e.g., power) and communications infrastructure. As a result, adding smart devices to such a system typically requires a substantial amount of labor and cost.

Insufficient infrastructure, or the complete lack thereof, is particularly problematic for monitoring and control applications that involve the sensing and/or control of a relatively few parameters in a remote geographic location. For such applications, it may be virtually impossible to install the electrical and communications infrastructure needed to support the use of smart field devices and, even if it were possible to do so, the costs associated with such an undertaking may be impossible to justify.

While the higher installation costs and the relative difficulty (and high costs) associated with reconfiguring (i.e., physically moving and/or adding smart field devices and/or equipment) a process control system that is implemented using known smart field devices, or adding smart field devices to a system or plant that does not currently have any such devices, can be justified for relatively large process control systems or plants, these high costs are typically difficult to justify or cannot be justified for smaller systems or plants. Additionally, retrofitting or adding smart field devices to relatively small process plants or systems may be particularly problematic because the physical integration of the smart field devices with the system or plant typically requires some or all of the plant or system to be shut down for a significant amount of time. For example, a small plant or factory that does not currently have a plant automation system may theoretically be able to increase production volume and quality by retrofitting an automation system based on smart field devices to its existing plant or system. However, the benefits of retrofitting such an automation system to the small plant or factory may not sufficiently offset the relatively high costs associated with installation of the smart field devices, the costs associated with having to slow or shut down production for a significant amount of time and the perceived business risks associated with lost production, the inability to supply customers with product, the possibility that the new automation system may result in unpredictable production volume and quality variations, etc.

Some manufacturers have attempted to address the above-noted problems by providing sensing devices that can be more easily retrofitted to equipment. However, these devices are not typically capable of carrying out process control activities because they do not provide information (e.g., sensed parameters, process conditions, etc.) on a continuous, periodic or real-time basis. In other words, while these devices may be capable of sensing information in connection with a piece of equipment, a process parameter, etc., they are not typically capable of timely providing this information, when the information is first available, to an overall process control routine. Instead, most, if not all, of these devices collect large amounts of information and send consolidated summaries or reports to a workstation or the like long after most of the information has been acquired. For example, Control Systems International (CSI) manufactures a diagnostic system for use with rotating equipment (e.g., electric motors, turbines, etc.). The CSI system includes vibration monitors that can be attached directly to a motor, or any other structure. The CSI vibration monitors collect and store vibration information for relatively long periods of time and convey this vibration information or data to a workstation or another computer system that uses the long-term vibration information or data to diagnose the conditions of the various pieces of equipment being monitored. Unfortunately, the CSI system functions as an off-line diagnostic system and, thus, cannot be effectively used for process control activities, real-time or periodic monitoring activities, etc.

SUMMARY OF THE INVENTION

The appendable system and devices described herein may be appended to process control equipment and/or other entities to perform data acquisition activities, data analysis activities and/or process control activities. Generally speaking, the appendable system and devices described herein may be used to provide a highly scalable monitoring and/or control system that can be easily added, appended or retrofitted to a new or established process system or plant in a cost effective manner. Additionally, the appendable system and devices described herein provide a relatively high degree of application flexibility by, for example, facilitating physical modification and/or reconfiguration of the control system such as adding and/or physically moving sensors, actuators, equipment, etc. associated with the process control system.

In one aspect, an appendable device may include a housing adapted to be mounted to a surface, a memory disposed within the housing and an input/output interface disposed within the housing. The input/output interface may be adapted to communicate with one of a sensor and a control output operatively coupled to the appendable device. The appendable device may also include a processor disposed within the housing and communicatively coupled to the memory. The processor may be programmed to communicate with the input/output interface and to communicate information related to the one of the sensor and the control output, as the information becomes available, to another device via a communication network. Because the appendable device described herein can communicate information to other devices, workstations, etc. when the information becomes available, the appendable device may be effectively used for process control activities, real-time data monitoring activities, etc.

In another aspect, an appendable device, may include an antenna, a transceiver communicatively coupled to the antenna and a processor communicatively coupled to the transceiver. The processor may be programmed to perform one of a periodic data monitoring activity and a process control activity. The appendable device may also include a memory communicatively coupled to the processor, an input/output interface adapted to operatively couple the processor to one of a sensor and a control output and a housing that holds the transceiver, the processor, the memory and the input/output interface. The housing may be adapted to be attached to a surface.

In yet another aspect, an appendable system for controlling a process may include a plurality of appendable devices. Each of the appendable devices may include an antenna, a transceiver, a processor, a memory, an input/output interface adapted to enable the processor to communicate with one of a sensor and a control output, and a housing adapted to facilitate surface mounting of the appendable device. The appendable system may also include a computer system adapted to communicate with one or more of the plurality of appendable devices so that a first one of the plurality of appendable devices senses a first parameter of the process and a second one of the plurality of appendable devices controls a second parameter of the process based on the first sensed parameter.

DESCRIPTION OF THE PREFERRED EMBODIMENTS

Figure 1:
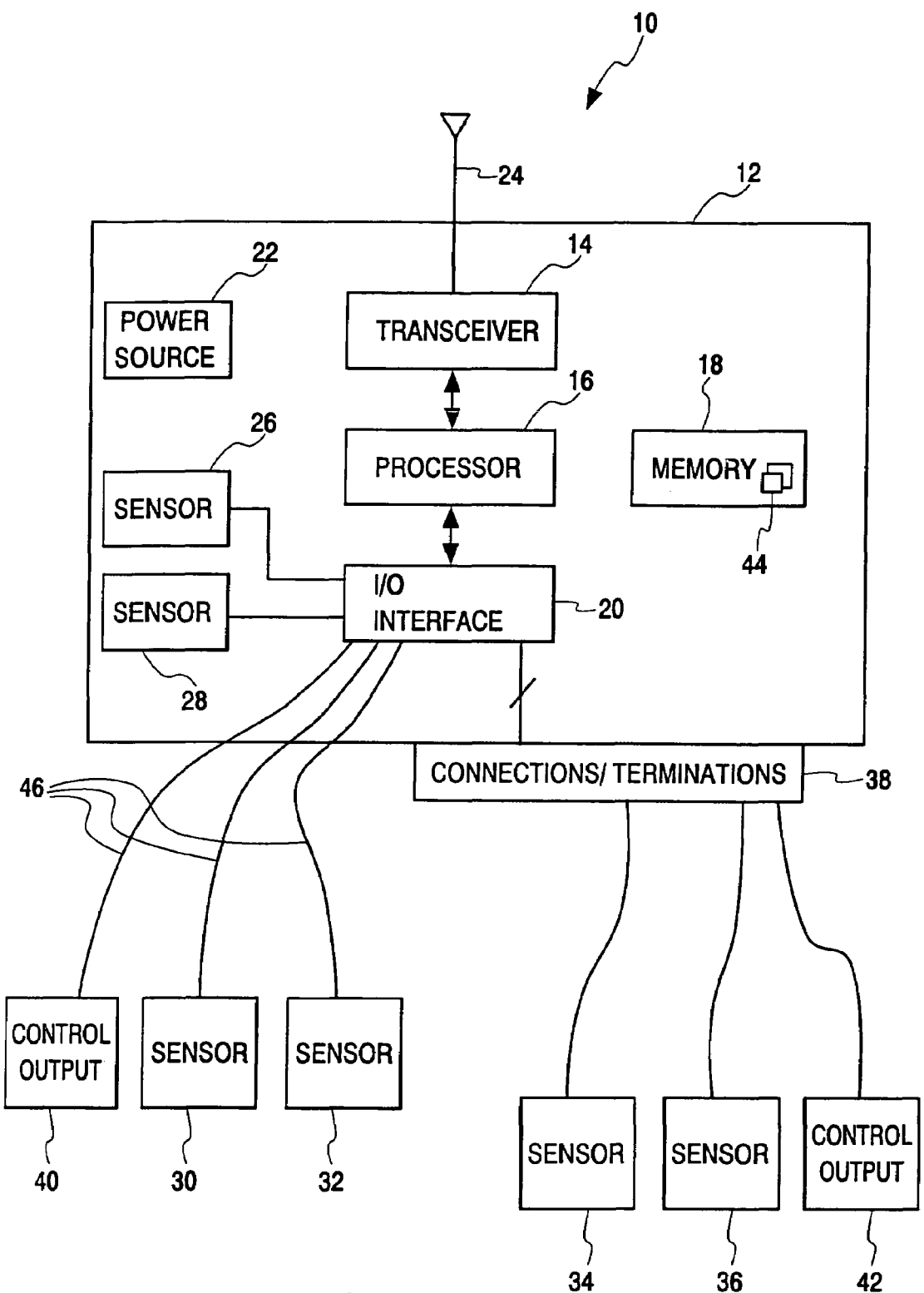
FIG. 1 is an exemplary block diagram of an appendable or attachable device that may be used to perform data acquisition activities, data analysis activities and/or process control activities.

The appendable system and devices described herein may be appended to process control equipment and/or other entities to perform data acquisition activities, data analysis activities and/or process control activities. Generally speaking, the appendable system and devices described herein may be used to provide a highly scalable monitoring and/or control system that can be easily added, appended or retrofitted to a process system or plant in a cost effective manner. Additionally, the appendable system and devices provide a relatively high degree of application flexibility by, for example, facilitating physical modification and/or reconfiguration of the control system, which may involve adding and/or physically moving sensors, actuators, equipment, etc. associated with the process control system.

More particularly, the appendable system and devices may be physically mounted, attached or appended to one or more surfaces or pieces of equipment within a new or established process plant or system in a relatively non-invasive manner. Specifically, the appendable or attachable devices may be configured to facilitate simple field installation or retrofit of the devices to equipment without requiring a shut down of the equipment and/or the process plant of which that equipment is a part. Such simplified and cost effective installation may be enabled by fastening mechanisms such as band clamps, Velcro™, magnets, self-tapping or self-threading screws, adhesives, etc. that do not typically require the services of a tradesperson such as, for example, an electrician, a plumber, a pipe fitter, etc. Additionally, the appendable devices may derive or generate their power using, for example, a super capacitor, an internal battery, vibrations induced by the equipment to which the devices are mounted, attached or appended, a photoelectric array, currents induced by a magnetic field, etc. and may communicate with each other and/or controllers, workstations, computer systems, etc. using any suitable wireless communication method, media and/or protocol, thereby minimizing or eliminating the need for preexisting electrical and communications infrastructure, the need for invasive electrical connections, the shut down of equipment and/or the system or plant, and the costly services of an electrician or other tradesperson.

While the appendable system and devices described herein are described in connection with a process control application, the appendable system and devices may be used in less complex applications such as, for example, simple data acquisition and/or monitoring applications, simple single-loop stand alone control applications, simple alarming applications, etc. Additionally, the appendable system and devices described herein may be integrated within a more complex process control system, which may control one or more large process control plants dispersed over a wide geographic region. For example, the appendable system and devices may be integrated with a DeltaV™ process control system, if desired, or any other similar or different process control system.

FIG. 1 is an exemplary schematic block diagram of an appendable or attachable device 10 that may be used to perform data acquisition activities, data analysis activities and/or control activities such as, for example, monitoring or controlling a piece of equipment a process and/or a system. As shown in FIG. 1, the appendable device 10 includes a housing 12 in which a transceiver 14, a processor 16, a memory 18 and an input/output (I/O) interface 20 are disposed. The appendable device 11 may also include an internal power source 22, an antenna 24, one or more internal sensors 26 and 28 and one or more external sensors 30 and 32. Additionally, one or more sensors 34 and 36 and/or other devices may be field wired or otherwise electrically coupled to the appendable device 10 via a connection or termination portion 38. The connection or termination portion 38 enables a field technician or any other person to connect additional or different sensors or other devices to the appendable device 10, to replace damaged or failing sensors and other devices, etc. Still further, one or more control outputs 40 and 42 such as, for example, relays, contactors, analog voltage or current outputs, frequency outputs, etc. may be connected either directly or via the termination portion 38 to the appendable device 10.

In general, the processor 16 may execute one or more software routines 44 stored in the memory 18 to perform data acquisition or monitoring activities, data analysis activities and/or control activities. For example, one or more of the sensors 26-36 may convey electrical signals or information to the processor 16 via the I/O interface 16. In turn, the processor 16 may process these electrical signals or information and, as described in greater detail in connection with FIG. 2, may send some or all of the processing results to a controller or workstation and/or to one or more other appendable devices via the transceiver 14 and the antenna 24. Alternatively or additionally, the processor 16 may send control signals or other signals to one or more of the control outputs 40 and 42 via the I/O interface 20 to carry out control activities such as, for example, turning a motor on or off, varying the speed of a motor, opening or closing a valve, a damper actuator or some other operator, etc.

The software routines 44 stored in the memory 18 may also enable the appendable device 10 to perform alarming functions (e.g., notifying an operator and/or another device within a control system that a control parameter is outside of a predetermined range, has exceeded a threshold, etc.) and self-diagnostic functions (e.g., detection of a failing or failed sensor, communications problems, etc.). In addition, if desired, the software routines 44 may also enable the appendable device 10 to perform security functions such as, for example, communications encryption, user authorizations (e.g., authenticate a user, approve a user for a requested level of access, etc.), etc. to prevent unauthorized persons from accessing information and/or affecting the operations of the appendable device 10.

As shown in FIG. 1, the appendable device 10 may include one or more internal sensors, such as the sensors 26 and 28, and/or may receive signals from one or more external sensors such as the sensors 30-36. In any case, various types and/or combinations of sensors may be used as needed to suit particular applications. For example, a group or combination of sensors may sense one or more parameters such as vibration, acceleration, temperature, humidity, acidity, turbidity, the presence and/or concentration of one or more chemicals and gasses, flow, altitude, geographic location, direction or heading, thickness, corrosion rate, color, level, angular velocity, speed, pressure, pulse rate, or any other desired parameter. In some cases, a group of sensors that senses a particular combination of parameters may be especially advantageous. For example, a sensor that senses angular velocity, angular acceleration and vibration may be particularly useful for monitoring the output shaft or drive mechanism of a large motor or engine to determine whether bearing maintenance may be needed, whether a potentially dangerous condition exists, etc. Combining sensed parameters in this manner may minimize the effort required to attach or append the devices and/or sensors needed to carry out a given application and may most efficiently use the amount of space available near to or on the equipment being monitored and/or controlled.

Additionally, for some applications, sensors that sense particular parameters may be mounted internally (e.g., the sensors 26 and 28) and other sensors, which may sense other parameters, may be externally connected to the appendable device 10 either through the termination portion 38 or directly via wires, for example, as shown in the case of the external sensors 30 and 32. For example, in some applications it may be advantageous to mount an acceleration or vibration sensor within the device 10 to eliminate the need to mount both the device 10 and a separate sensor to the piece of equipment. However, in some applications, space constraints may make it impossible to physically mount the device 10 directly to the part of the equipment that needs to be monitored. In such cases, the acceleration or vibration sensor may be external to the device 10 (e.g., one of the sensors 30-36) to enable independent mounting of the device 10 and the sensor. In the case of a motor, for example, the device 10 (i.e., its housing 12) may be attached to a wall, a sheet metal surface, etc. that is near to the motor while the external acceleration or vibration sensor may be mounted near to the shaft or a bearing of the motor.

Still further, the appendable device 10 may be connected to or may include (i.e., may have mounted internally) one or more control outputs such as, for example, the control outputs 40 and 42. These control outputs may include individual or combinations of outputs such as, for example, high and/or low voltage dry contact outputs, contactors, relays, analog outputs such as 4-20 milliamp (mA), 0-10 volts, etc., digital outputs, variable frequency and/or pulse width signals, digital words and/or more complex digital messages or information, etc. In any case, the external control outputs 40 and 42 may facilitate attachment of the control outputs 40 and 42 near a particular piece of equipment and/or a portion of that equipment. For example, in the case where the control output is a relay or a contactor, the control output may be mounted on or near a motor to facilitate the use of the relay or contactor as a mechanism for controlling the supply of power to the motor. Additionally or alternatively, one or more of the control outputs may be mounted internally within the appendable device 10 and the connection of external equipment and/or other devices to those control outputs may be implemented via the connection portion 38, wires, etc.

The electrical connections between the external sensors 30-36 and control outputs 40 and 42 may be implemented using any desired technique. By way of example, the sensors 30 and 32 and the control output 40 may be electrically connected or coupled to the appendable device 10 via wires or cables 46, each of which may include one or more individual wires or conductors as needed. Additionally, each of the wires or cables 46 may include electrical shielding to minimize or eliminate the effects of interference or noise on the performance of the sensors 30 and 32 and the control output 40. The cables 46 may be made from any desired material or materials to suit the environmental characteristics (e.g., the temperature, humidity, etc.) associated with a particular application and/or to suit the characteristics of the signals carried by the cables 46 (e.g., high current, high voltage, low-level signals, high frequency signals, etc.). To maximize environmental ruggedness, the cables or wires 46 may be permanently fixed via soldering, welding, crimping, etc. to their respective sensors and control output and the appendable device 10. For example, in a case where one or both of the sensors 30 and 32 are adapted to sense accelerations or vibrations, it may be desirable to permanently weld or solder the cables associated with those sensors to eliminate or minimize the possibility of a failure (e.g., a breaking or opening) of the electrical connections between the device 10 and the sensors 30 and 32. In general, welded or soldered connections may be preferred for those applications in which adverse environmental characteristics such as high humidity levels, condensation, high vibration levels, excessive shocks or impacts, etc. could easily degrade or compromise other types of connections such as, plugable connectors, crimped connections, etc.

Alternatively or additionally, the cables or wires 46 may include plugable or modular connectors (not shown) that facilitate easy field attachment and or replacement of sensors, control outputs, etc. associated with the device 10. Such plugable connectors may be positioned at either end of the cables or wires 46 or at some point between the ends of the cables or wires 46. By way of example, the ends of the cables 46 farthest from the device 10 may have one-half of the plugable connector (i.e., either the male or the female portion) and the sensors and/or control outputs may have the other, complementary half of the connector. In this manner, sensors and control outputs may be attached to the cables or wires 46 as needed, sensors may be replaced, serviced or upgraded, etc. Of course, some or all of the male and female connector portions could be located between the sensors and control outputs and the device 10 so that the connection of the male and female connector portions occurs somewhere between the sensor or control output and the device 10. Alternatively or additionally, some of all of the connector portions may be located at the device 10 (e.g., fixed to the housing 12) so that the connection occurs at or near the device 10.

The wires or cables 46 may be, or may include, a pigtail arrangement whereby a pigtail (i.e., one or more wires) extending from each sensor or control output may be connected to a corresponding pigtail extending from the device 10 via twist-on wire connectors, crimp connectors, solder and shrink tubing, etc. Alternatively or additionally, the sensors and control outputs may include screw terminals, solder pads, jacks (e.g., RCA-type, banana, etc.) or any other suitable connector designed to receive a wire or cable.

In general, the wires or cables 46 may be provided in fixed lengths (a plurality of different lengths may be available to suit particular applications) at the time the device 10 is manufactured, thereby minimizing or eliminating the labor and costs associated with having to connect sensors, control outputs, etc. to the device 10 in the field near the equipment or system being monitored and/or controlled. While such fixed length cables or wires 46 can minimize or eliminate labor, particularly expensive trade labor such as, for example, electrician labor, such fixed lengths may make it more difficult or, in some cases, impossible to mount the appendable device 10 and one or more of the sensors and control outputs in their respective ideal or best locations. For example, the longest available cables 46 may be too short to enable a desired or required mounting distance between a sensor or control output and the device 10. On the other hand, the shortest available cable may provide an excessive amount of extra cable or wire that consumes an undesirable amount of space or an amount of space that is not available surrounding a piece of equipment.

The connection or termination portion 38 may include a plurality of screw terminals, some or all of which are removable or plugable. Such screw terminals may be configured to accept spade-type connectors, wire ends, etc. Alternatively or additionally, the termination portion 38 may include one or more jacks such as, for example, RCA-type jacks, banana plug jacks, etc. Preferably, but not necessarily, the termination portion 38 is integrally attached or formed with the housing 12 of the device 10 to provide strain relief, to protect the electrical terminations therein from the effects of the environment surrounding the device 10, etc;

Internal sensors (e.g., the sensors 26 and 28) and internal control outputs (not shown) may be mounted to a printed circuit board and/or may be fixed to the housing 12. For example, the housing 12 may include bosses, standoffs, plastic snaps, etc. to which a sensor may be directly mounted or attached and/or to which a printed circuit board (having sensors and/or control outputs mounted thereto) is attached. Alternatively or additionally, the internal sensors and control outputs may be potted, glued or otherwise fixed within the housing 12.

As shown in FIG. 1, the power source 22 may be disposed within the housing 12 of the appendable device 10. The power source 22 may be implemented using any suitable technology and/or technique. For example, the power source 22 may be a battery, either rechargeable or disposable, may be based on a super capacitor, may be a photoelectric cell or array of cells, may be a vibration driven generator, may be an induction-type power source, etc. In the case of a vibration-based power source, the power source 22 may be charged and/or may provide electrical output as long as the device 10 is vibrated at an amplitude greater than predetermined level and at a frequency greater than a predetermined frequency. Such a vibration-based power source enables the device 10 to be mounted to a piece of rotating equipment, for example, and to derive its power from the vibrations generated by the rotating equipment. As a result, such a vibration-based power source eliminates the need to install external power supply wires or cables, which may be particularly advantageous in situations where the equipment being monitored and/or controlled is physically remote and/or difficult to access with respect to suitable sources of power for the device 10.

In the case where the power source 22 uses induction to produce energy for use by the device 10, a coil, loops of wire, etc. may be used to generate currents in response to varying magnetic fields that impinge on the device 10. The coil, loops of wire, etc. may be formed integrally with a printed circuit board using conductive traces, which may be formed using conductive ink, etched copper, etc., and/or may be discrete wire loops or coils that are attached to a printed circuit board, attached to the housing 12, etc. Of course, the antenna 24 may be used to serve both a communications function (i.e., receiving and sending communication signals) and a power generation function in which magnetic fields impinging on the antenna 24, which may or may not also be carrying any communication information, induce currents in the antenna 24 that are processed by the power source 22 to provide suitable voltages and currents to the circuitry within the device 10. Of course, the power source 22 may include multiple types or combinations of power generation technologies and techniques. For example, a photoelectric cell or array, a vibration powered generator or an induction device may store energy in a super capacitor or a rechargeable battery for use by the device 10.

While the power source 22 is depicted in FIG. 1 as being mounted within the appendable device 10, the power source 22 could alternatively be mounted external to the housing 12 to facilitate replacement of the power source 22, if needed. Still further, the appendable device 10 may be adapted to receive power from an external source such as, for example, an external transformer or power supply supplying alternating current (AC) or direct current (DC) power, readily available line voltage (e.g., 120 volts AC), etc. in which case field wiring of the external power source to the device 10 would be required.

The processor 16 may be a special purpose processing unit such as, for example, an application specific integrated circuit (ASIC), may be a microcontroller or may be a general purpose microprocessor unit. The memory 18 may be a separate unit or device as shown in FIG. 1 or may be integral with the microcontroller, ASIC, etc. that performs the functions of the processor 16. Alternatively, the memory 18 may be distributed within one or more of the other blocks shown in FIG. 1. Any suitable type of memory technology or combination of memory technologies may be used including random access memory (RAM), read-only memory (ROM), electrically erasable programmable read only memory (EEPROM), flash memory, erasable programmable read only memory (EPROM), magnetic memory media, optical memory media, etc.

In general, the I/O interface 20 enables the processor 16 to communicate with the sensors 26, 28 and 30-36 and the control outputs 40 and 42. More specifically, the I/O interface 20 may include an analog-to-digital (A/D) convertor, one or more amplifiers, filters (e.g., anti-aliasing, noise reduction, etc.), electrical isolation devices such as, for example, optical isolators, transformers, etc., passive and/or active protection circuitry such as, for example, transient suppression and electrostatic discharge protection devices, etc. Although the I/O interface 20 is shown as a separate functional block in FIG. 1, some or all of the functions performed by the I/O interface 20 may be integrated within the processor 16. For example, in the case where the functions performed by the processor 16 are implemented using a microcontroller, the microcontroller may also include an on-board A/D convertor.

The transceiver 14 may use any desired wireless communication technology and protocol. For example, the transceiver 14 may be adapted to use a spread spectrum communication technique, which is a well-known communication technique and, thus, is not described in greater detail herein. In addition, the transceiver 14 may perform one or more techniques that improve the integrity and/or quality of the information being transmitted and/or received by the device 10. For example, error detection and correction techniques such as Bose-Chadhuri-Hocquenghem (BCH) or fire coding may be used to improve the quality of the information being processed by the processor 16 and/or the information being sent by the processor 16 to other systems and devices. Further, the transceiver 16 may use redundant transmission techniques (e.g., duplicate message transmission) and/or n-level parity techniques to improve the quality or integrity of communications. As with the I/O interface 20 described above, one or more of the functions performed by the transceiver 14 may be performed by the device that performs the functions of the processor 16. For example, the routines 44 may include software that, when executed by the processor 16, perform one or more error detection techniques.

The antenna 24 enables the device 10 to perform wireless communication activities with other appendable devices similar or identical to the device 10, other controllers, workstations, etc., or any other wireless communication devices such as cellular phones, pagers, hand-held computers (e.g., personal data assistants), lap-top computers, etc. More specifically, the antenna 24 may be optimized for a particular frequency or range of frequencies, for particular interference response characteristics or, more generally, to suit any particular application or applications. The antenna 24 may be implemented using a wire whip that is attached to the housing 12 and/or a circuit board within the housing 12. Alternatively, the antenna 24 may be implemented using one or more loops of wire or conductive traces that may be integral with the housing 12 or a printed circuit board within the housing 12.

The various functional blocks and devices shown within the housing 12 of the device 10 may be implemented using any suitable technology or combination of technologies. For example, the circuitry needed to perform the functional blocks shown within the device 10 may be implemented using discrete components, one or more ASICs, integrated circuits, etc. that may be mounted to a printed circuit board having one or more layers, a ceramic substrate such as that used in fabricating hybrid circuitry, etc. In the case that the circuitry is implemented using integrated circuits, one or more of the integrated circuits may be mounted to a circuit substrate using a die-down configuration in which silicon die are mounted and wire-bonded directly to a circuit substrate and then encapsulated in silicone gel, epoxy or the like to protect the circuitry and environmentally sensitive wire bond connections. Still further, the circuitry within the device 10 may be implemented using multiple circuit substrates that are interconnected via wires, plugable connectors, soldered headers, etc. To protect the circuitry within the device 10 from environmental stresses such as vibration, shock, moisture, etc., the circuitry may be encapsulated or potted in epoxy, silicone gel, a urethane dip or spray, etc.

The housing 12 may be of any suitable shape or geometry that facilitates mounting or attachment of the device 10 to a variety of types of equipment, surfaces, etc. For example, the housing 12 may have a cylindrical or puck-like geometry, may have a cube or box-like geometry or may have any other desired geometry. The housing 12 may consist of multiple parts or components that are fastened together using glue, ultrasonic welds, threaded fasteners, rivets, etc., or may be a substantially unitary structure. Any suitable material or combination of materials may be used to fabricate the housing 12. For example, the housing may be made of plastic, which may be injection molded, or may be made of metal, which may molded, stamped and/or welded. Of course, the housing 12 may be made of multiple types of materials so that particular portions of the housing 12 are made of materials best suited to perform the functions performed by those portions of the housing 12. For example, the housing 12 may include a base plate or mounting plate portion (not shown) that is made from heavy gauge stamped steel to provide a highly rugged portion that can be screwed, bolted, riveted, etc. to a piece of equipment, a sheet metal surface, etc. without damaging the device 10 or the mounting plate. In addition to a rugged mounting plate, the housing 12 may also include a plastic cover or cap (not shown), which may be less rugged than the mounting plate, that covers the circuitry, the antenna 24 or any other internal portions of the device 10 to prevent dust, fingers, screwdrivers, metal filings, etc. from damaging or impairing the operation of the circuitry within device 10. More generally, the materials and geometry of the housing 12 may be selected to suit any particular application. For example, applications involving hazardous environments (e.g., explosive conditions, caustic gasses, etc. or rugged environments (e.g., high shock, impact, acceleration, vibration, liquid water, etc.) may require a housing that completely encapsulates the circuitry of the device 10. On the other hand, applications involving environmental conditions that are relatively benign in nature (e.g., measuring a temperature in an office space), may only require that the housing 12 functions to prevent debris or dust, fingers and/or other objects from contacting sensitive circuitry directly.

The housing 12 may be configured to facilitate mounting of the device 10 to a piece of equipment. For example, the housing 12 may have through-holes, mounting feet or tabs with through-holes, slots, etc. that enable a field technician to fasten the device 10 to a sheet metal surface or another suitable surface using self-tapping screws, self-threading screws, rivets, etc. Alternatively or additionally, the housing 12 may include features that enable a band clamp, tie-wrap or the like to be used to fasten the device 10 to a piece of equipment or to an object proximate to that piece of equipment. Further, the housing 12 may include a surface, surfaces or some other feature that enables an adhesive, double-sided tape, Velcro™, magnets, pop rivets, etc. to be used to fasten or attach the device 10 to a piece of equipment or a surface. Still further, the housing 12 and the device 10 may be configured to enable the device 10 to be mounted by simply placing or resting the device 10 on a piece of equipment, thereby eliminating the need for additional fasteners and/or attachment mechanisms.

Figure 2:
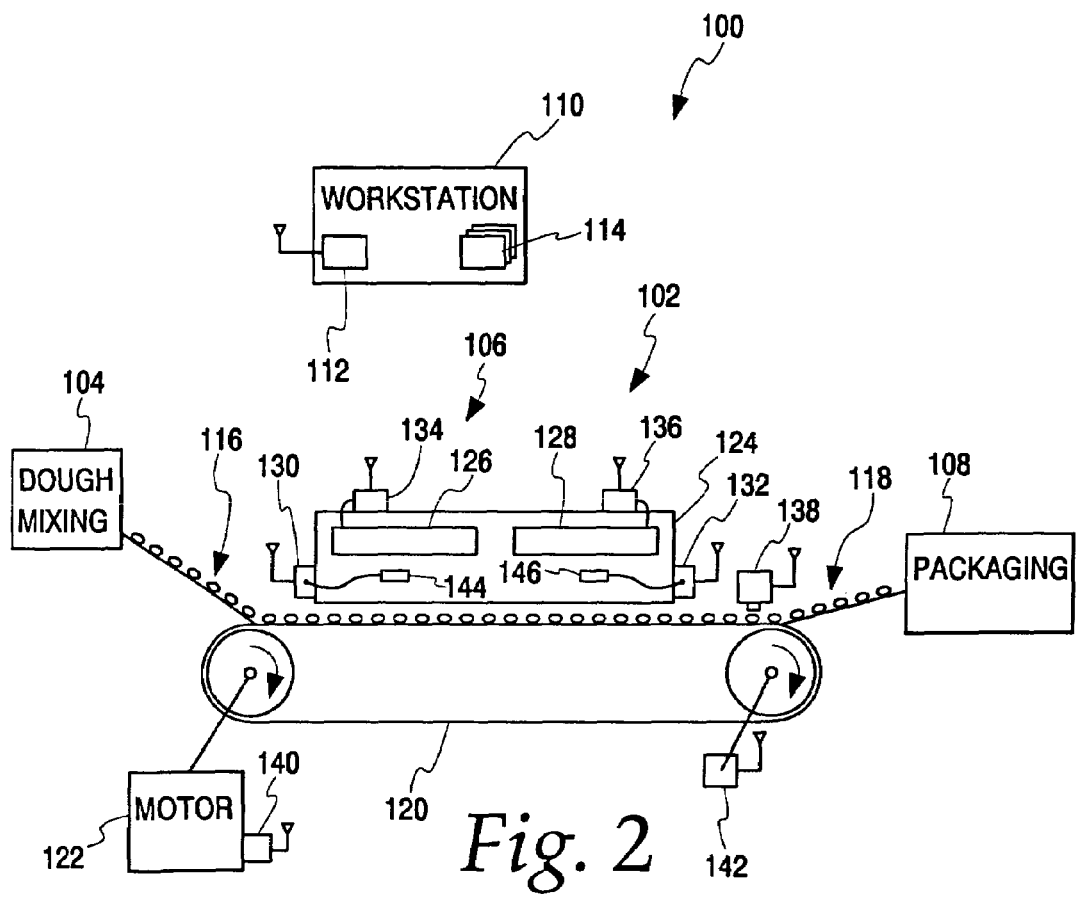
FIG. 2 is an exemplary diagrammatic view that depicts one manner in which one or more appendable devices, similar or identical to that shown in FIG. 1, may be used to automate a process control system or plant.

FIG. 2 is an exemplary diagrammatic view that depicts one manner in which one or more appendable devices, such as the device 10 shown in FIG. 1, may be used to automate a process control system or plant 100. By way of example, the plant 100 shown in FIG. 1 is a portion of a bakery that produces cookies. Of course, the appendable devices described herein, such as the exemplary device 10 shown in FIG. 1, may be used in any other type of system or plant having a higher or a lower degree of complexity than the system 100 shown in FIG. 2.

More specifically, the plant 100 shown in FIG. 1 includes a cookie making process or portion 102 that includes a dough mixing process or portion 104, a baking process or portion 106 and a packaging process or portion 108. The cookie making process 102 may also include other processes, portions or subsystems such as, for example, a cookie cutting or shaping process, a quality control process, a decorative topping process, etc., none of which are shown in FIG. 2 for purposes of clarity.

In general, the operation of the cookie making process or portion 102 may be controlled via a workstation 110 or any other suitable type of computer system. As shown in FIG. 2, the workstation 110 includes a transceiver 112 that enables the workstation 110 to communicate with one or more appendable devices, such as the device 10, using any desirable wireless communication technology and protocol. The workstation 110 may also include one or more software routines 114 that, when executed by a processor (not shown) within the workstation 110, enable the workstation 110 to monitor, analyze and/or control the cookie making process 102, as well as other processes (e.g., the dough mixing process 104, the packaging process 108, etc.) within the plant 100 or at other plants (not shown) in a desired manner.

As can be seen in FIG. 2, the dough mixing process 104 provides raw cookies 116 to the baking process 106 and, in turn, the baking process 106 provides baked cookies 118 to the packaging process 108 which, in general, sorts cookies and places predetermined amounts of the sorted cookies in one or more styles and sizes of packages that enable convenient shipping and sale of the cookies 118. As can also be seen from FIG. 2, the baking process or portion 106 includes a conveyor 120, which is driven by a motor 122, and an oven 124 having heating elements 126 and 128. Additionally, the baking process or portion 106 includes a plurality of appendable devices 130-142, all of which are associated with the oven 124, the motor 122, etc. and/or other portions of the baking process 106 as described in greater detail below.

The appendable devices 130 and 132 are configured to sense temperature using respective temperature sensing elements 144 and 146 which, as shown in FIG. 2, are external to and remotely situated from the devices 130 and 132. Preferably, but not necessarily, the temperature sensing elements 144 and 146 are situated within the oven 124 to best sense the ambient temperature surrounding the cookies passing through the oven 124. Further, because two independent heating elements (i.e., the heating elements 126 and 128) are used in the oven 124, two ambient temperature zones may be established and each of the sensing elements 144 and 146 may only measure the temperature in their respective zones.

The devices 130 and 132 may be appended or attached to the oven 124 in any desired manner. For example, in the case where the surfaces to which the devices 130 and 132 are to be attached are sheet metal, self-tapping or self-threading screws may be used to attach the devices 130 and 132 to the oven 124. Alternatively, the devices 130 and 132 may be attached to the oven 124 using double-sided tape or any other suitable adhesive, Velcro™, etc. The temperature sensing elements 144 and 146 may be supplied as part of the oven 124, in which case the devices 130 and 132 may include appropriate input connections via pigtails (i.e., wires) and/or a termination portion having screw terminals that facilitate the electrical connection of the temperature sensing elements 144 and 146 to their respective devices 130 and 132. If one or both of the temperature sensing elements 144 and 146 are not supplied with the oven 124, one or both of the temperature sensing elements 144 and 146 may be provided with the devices 130 and 132 (i.e., permanently attached via wires, attached via a modular connector, termination portion, etc.)

The appendable devices 134 and 136 include control outputs that are configured to control the amount of power flowing through the respective heating elements 126 and 128, thereby controlling the heat generated by the elements 126 and 128 and the ambient temperature within the oven 124. For example, if the heating elements 126 and 128 are electric heating elements, the devices 134 and 136 may provide dry contact outputs that may be operated by the devices 134 and 136 to control the flow of electrical current to the heating elements 126 and 128. As with the devices 130 and 132, the devices 134 and 136 may be attached or appended to the oven 124 in any desired manner. However, because the devices 134 and 136 are located on a horizontally oriented surface of the oven 124, the devices 134 and 136 may be mounted to the oven 124 by simply resting the devices 134 and 136 on top of the oven 124 without using any additional fasteners, glue, etc. Additionally, the electrical connections between the heating elements 126 and 128, their respective devices 134 and 136 and a source of electrical power may be implemented using any desired technique including, pigtails and twist-on wire connectors, screw terminals, modular connectors, etc.

The appendable device 138 is configured to sense the color (i.e., the doneness) of the baked cookies 118. The device 138 may, for example, include an internally mounted charge coupled device (CCD) that captures digital images of the baked cookies 118 via an aperture or opening in the housing of the device 138. As described in greater detail below, information relating to the doneness of the baked cookies 118 may be used to better control the baking process 106 to more efficiently produce higher quality cookies.

The appendable device 140 is configured to provide a control output that varies the speed of the motor 122 and the appendable device 142 is configured to sense the rotational speed of the conveyor 120. As with the other appendable devices 130-138, the devices 140 and 142 may be physically attached and electrically interconnected to their respective portions of the baking process 106 using any of the techniques described herein.

Each of the appendable devices 130-142 has an antenna that enables the device to communicate with other ones of the devices 130-142 and/or with the workstation 110 using any desired wireless communication technique. Additionally, although not shown in FIG. 2, the appendable devices 130-142 and/or the workstation 110 may be configured to communicate with cellular phones, pagers, laptop computers, hand-held computers, or any other device capable of wireless communication. Likewise, the appendable devices 130-142 may be configured to engage in wireless communications with other workstations or appendable devices that are located in other portions of the cooking making process 102, other portions of the plant or bakery 100, other plants, etc.

In operation, the appendable devices 130-142 may cooperate with the workstation 110 and each other to control the cookie making process 102 and, in particular, the baking process or portion 106. More specifically, the appendable device 138, which measures or senses the color of the baked cookies 118, may provide color information to the workstation 110 via a wireless communication link. In turn, the workstation 110 may analyze the received color information and may control the baking process 106 by sending commands and/or other information to the appendable devices 134, 136 and 140, which are configured as control output devices and which may vary the ambient temperature within the oven 124 and/or the speed of the conveyor 120 to control the extent to which cookies are baked by the oven 124 (i.e., the doneness of the cookies).

For example, the workstation 110 may receive color information from the device 138 indicating that the baked cookies 118 are dark brown in color. In this case, the workstation 110, after analyzing the color information, may send control information, messages or commands to the device 140 and/or the device 142 to cause the speed of the conveyor 120 to increase, thereby exposing the cookies for less time to the ambient temperature within the oven 124 and reducing the baking time. On the other hand, if the workstation 110 receives color information from the device 138 indicating that the baked cookies 118 are a pale tan color, the workstation 110 may send control information, messages or commands that cause the speed of the conveyor 120 to decrease, thereby increasing the baking time of the cookies. Of course, the workstation 110 may employ any desired control loop techniques to control the baking time (i.e., the conveyor speed) in an appropriate manner. For example, control loops having proportional, integral and/or derivative (PID) control parameters may be used, if desired. Such PID-based control loops or techniques are well known and, thus, are not described in greater detail herein.

There are many ways in which the workstation 110 and the devices 140 and 142 may interoperate to control the speed of the conveyor 120. For example, the workstation 110 may send command information, control information, etc. to the appendable device 142 instructing the device 142 to control the speed of the conveyor 120 to a particular speed. The device 142 may then measure the speed of the conveyor 120 and send commands, messages, control information, etc. to the device 140 which, in turn, causes the speed of the motor 122 to be increased or decreased as needed to maintain the conveyor speed targeted by the device 142. By way of example only, the device 140 may include a 4-20 mA control output device and the device 142 may send control information, commands, etc. to the device 140 that cause the device 140 to provide a particular current corresponding to the rotational speed targeted by the device 142 to the motor 122. Thus, as can be seen from the above example, the workstation 110 does not necessarily have to be directly involved in communicating with the device 140 and the device 142 to control the speed of the motor 122. Rather, the workstation 110 may communicate directly with the device 142 and the device 142 may be configured to communicate directly with the device 140 to carry out a closed-loop speed control of the motor 122 and the conveyor 120.

As with the control of conveyor speed or baking time described above, the oven temperature or baking temperature of the baking process 106 can be controlled via the interoperation of the appendable devices 130-138 and the workstation 110. For example, the device 138 may send color information to the workstation 110 indicating that the baked cookies 118 are relatively dark in color (i.e., overdone) or relatively light in color (i.e., underdone). The workstation 110 may then communicate with the devices 130 and 132 to measure the ambient temperatures within the oven 124 and may send appropriate control messages, commands, etc. to the devices 134 and 136 to decrease or increase the amount of power that is provided to the heating elements 126 and 128 to decrease or increase the ambient temperature within the oven 124. The workstation 110 may continue to receive oven temperature information from the devices 130 and 132 and may continue to send commands, messages or any other information to the devices 134 and 136 to vary the amount of power supplied to the heating elements 126 and 128 until the temperature measured by the temperature sensing elements 144 and 146 reaches the desired baking temperature. Of course, the workstation 110 may use any desired control loop techniques, including PID-based control, to control the baking temperature within the oven 124 in an appropriate manner.

As with the control of the conveyor speed, the workstation 110 does not necessarily have to communicate directly with all of the devices 130-136 to control the ambient temperature within the oven 124. Instead, the workstation 110 may receive color (i.e., doneness) information from the device 138 and, in response may send commands, messages and/or other information associated with a particular desired baking temperature to the devices 130 and 132. The devices 130 and 132 may then send commands, messages, etc. to their respective control output devices 134 and 136 to cause more or less power to be supplied to the heating elements 126 and 128.

Of course, because the heating elements 126 and 128 can be controlled independently, the temperatures zones within the oven 124 that correspond to the temperature sensing elements 144 and 146 may be controlled to the same or different temperatures to suit a particular cookie baking application. Furthermore, it should be recognized that for some applications it may be desirable to maintain a constant temperature within all areas of the oven 124 and to vary only conveyor speed to control the extent to which cookies are baked. In still other applications, for example, it may be desirable to vary only the baking temperature while maintaining a constant conveyor speed, particularly in cases where upstream and downstream production processes (e.g., dough mixing, packaging, etc.) require a particular rate or line speed for efficient operation of the overall cookie making process 102. Other applications may vary both oven temperature and conveyor speed to best optimize cookie quality, production efficiency or any other desired parameter.

While in operation, the appendable devices 130-142 can send alarm messages or notifications to the workstation 110 and/or directly to each other. For example, one or both of the devices 130 and 132, which sense temperatures within the oven 124, may detect an out-of-range temperature condition (e.g., that a temperature has exceeded or has fallen below a predetermined limit) and may send an appropriate alarm to the workstation 110. The workstation 110 may then display the out-of-range temperature condition to a system user or operator via an alarm panel or banner or using any other desired display technique. Alternatively or additionally, the alarm information may be communicated directly to one or both of the devices 134 and 136 which, in turn, may respond to the alarm information by, for example, halting the flow of power to the heating elements 126 and 128.

While the appendable devices 130-142 shown in FIG. 2 are described as providing a single control output or a single sensory input, some or all of the devices 130-142 could have multiple sensory inputs and control outputs or combinations thereof. For example, a single appendable device having a temperature sensor input and a dry contact output may be substituted for the devices 130 and 134 as well as the devices 132 and 136, thereby reducing the number of appendable devices that have to be mounted to or attached to the oven 124, which may significantly reduce installation labor and costs and more efficiently utilize available mounting area on the oven 124. Similarly, a single appendable device having a speed sensing input and a 4-20 mA control output could be substituted for the devices 140 and 142. More generally, a single multi-purpose or generic appendable device having, for example, a temperature input, a dry contact control output, a 4-20 mA control output, a color sensing input and a speed sensing input may be used to implement the system shown in FIG. 2. Such a general purpose or generic appendable device would enable control of the baking process 106 by three or four such generic appendable devices rather than the seven devices shown in FIG. 2. Of course, the appendable devices described herein can be made to include any desired number and combination of sensing inputs and control outputs.

It is important to recognize that while the baking process 106 described in connection with FIG. 2 is configured to enable wireless communications between the appendable devices 130-142 and the workstation 110, between the appendable devices 130-142 via the workstation 110 (i.e., with the workstation 110 acting as a communication hub), directly between devices (i.e., without using the workstation 110 as a communication hub), other types of communication schemes using hardwired networks and techniques could be used instead of or in addition to the all-wireless system shown in FIG. 2. For example, some or all of the devices 130-142 shown in FIG. 2 may be interconnected to each other and the workstation 110 via an ethernet network and may communicate with each other using any desired communication protocol, including, for example, the PROFIBUS protocol, the Foundation Fieldbus protocol, etc.

Still further, while FIG. 2 depicts the cookie making process 102 as being controlled using a single workstation (i.e., the workstation 110), additional workstations may be employed. In that case, the functions performed by the software routines 114 may be distributed among the multiple workstations and may be performed within those workstations. Alternatively, a controller such as, for example, a DeltaV™-type controller may be used in addition to or instead of the workstation 110. Still further, workstations and/or controllers could be eliminated completely and the devices 130-142 may be configured to communicate with each other using, for example, a peer-to-peer communication scheme. In that case, the functions performed by the software routines 114 could be distributed among the devices 130-142 that carry out, or that would be best suited to carry out, those functions.

Although the system or plant 100 shown in FIG. 2 is depicted as having a workstation 110 and appendable devices 130-142 that control only a portion of the cookie making process 102 (i.e., the baking process 106), other processes such as the dough mixing process 104 and the packaging process 108 within the cookie making process 102, or any other process or device within the plant 100, may be controlled in a similar manner.

The appendable devices described herein may be used within a wide variety of applications in addition to the exemplary application shown in FIG. 2. Generally speaking, the appendable devices and system described herein may be used to carry out any type of process control activities, data management services, predictive control monitoring, etc. More specifically, the appendable devices and system described herein may be particularly well suited for use in monitoring and/or controlling the operations of a vineyard. For example, a plurality of appendable devices may be distributed among the vines to measure the moisture content and acidity of the vineyard soil and may instruct vineyard operators to (or may automatically) apply an appropriate type and amount of fertilizer to the vines, water the vines, etc. In another exemplary application, a plurality of appendable devices having internal location detectors (e.g., global positioning units) may be attached to cows or horses within a herd or multiple herds and may monitor or track the movements of the herd for a rancher. The rancher may use such herd location information to develop a maintenance plan for grazing areas, determine the fastest route to the herd, etc. In still another exemplary application, appendable devices may be attached to one or patients or animals within a hospital or other facility to enable remote monitoring of patient physiological conditions, patient location, patient status (e.g., sleeping, moving, awake, etc.), etc. In yet another exemplary application, a plurality of appendable devices may be used to monitor and/or automatically control the level of water in a flood drainage system. In that application, each of the appendable devices may control the operation of a particular flood gate and/or or warning signal (e.g., a flashing light, siren, etc.) and may communicate the status of its water level, gate position, warning condition, etc. to the other appendable devices and/or to a central facility (e.g., a municipal facility). In this manner, municipalities may be better able to better avert potentially dangerous flood conditions or, in the event that a flood cannot be prevented, may be able to more quickly dispatch rescue personnel to flooded areas to minimize or prevent the loss of lives.

Figure 3:
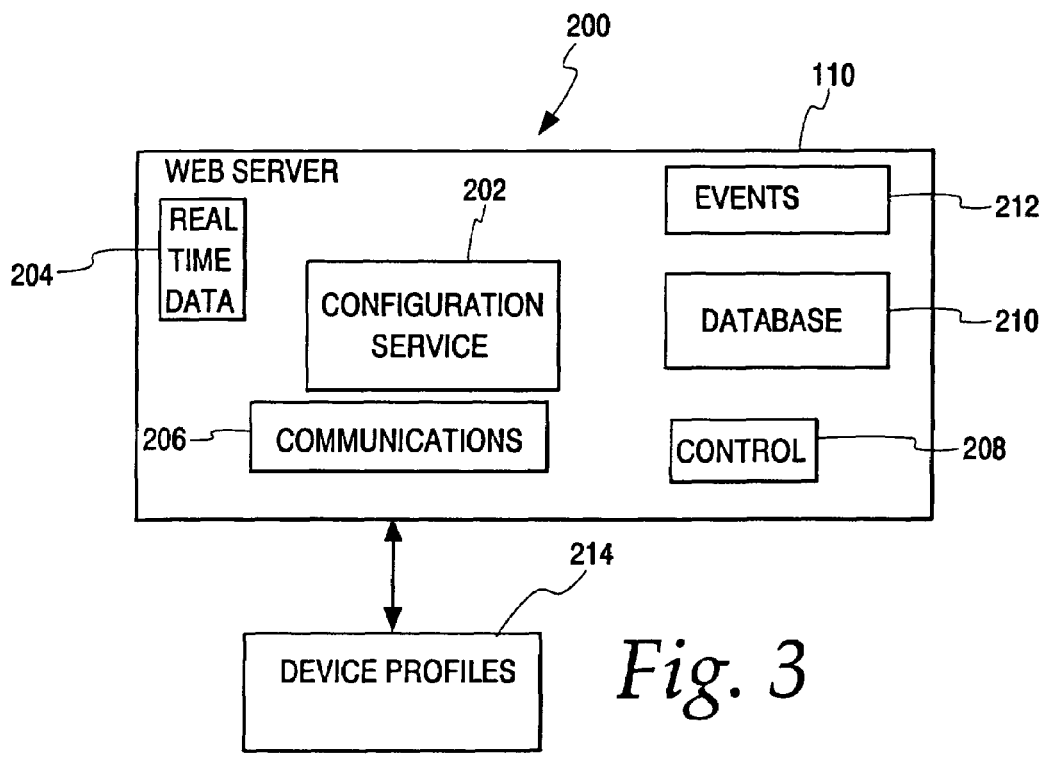
FIG. 3 is an exemplary functional block diagram that depicts one possible logical configuration of the workstation shown in FIG. 2.

FIG. 3 is an exemplary functional block diagram that depicts one possible logical configuration 200 of the workstation 110 shown in FIG. 2. In this example, the workstation 110 is configured as a web server having a configuration service 202, a real time data service 204, a communications block 206, a control block 208, a database 210 and an events service 212. Additionally, the server 110 may receive device profiles and/or configuration information 214 from one or more appendable devices.

The configuration service 202 may include functions that enable the workstation 110 to automatically detect the presence of appendable devices and automatically upload the profiles 214 associated with these detected devices and store this configuration and/or device profile information in the database 210. The appendable devices described herein may be self-revealing during the configuration process and, thus, may be adapted to provide information such as, for example, the version of the device, a unique tag or identifier associated with the device, a manufacturer name associated with the device, the location of the device, etc. to the configuration service 202. The configuration service 202 may also provide a graphical user interface or portal that enables a system user or operator to view the logical interrelationships between the appendable devices, other types of devices, workstations, controllers, etc. used within a system or plant.

The real-time data service 204 may enable the server 110 to continuously monitor parameters sensed by one or more appendable devices, the status of any device used within a process or plant, etc. The real-time data service 204 may also provide graphical views that enable a system user or operator to view real-time data in a graphical format, thereby enabling the user or system operator to recognize trends, erratic control performance, impending dangerous conditions, etc.

The communications block 206 may use any desired communication technique to enable the server 110 to communicate with appendable devices, or any other devices, systems, etc. that may be distributed within a plant, between plants, etc. For example, the communications block 206 may communicate in conformance with the well known TCP/IP communication protocol and may be adapted to send and receive information using messages that have been formatted according to an extensible markup language (e.g., XML). Of course, any other suitable communication protocol and message format can be used instead. In addition, the communications block 206 may perform security functions such as, for example, communications encryption, authenticated logins, etc.

The communications block 206 may also store communication path or route information that enables the appendable devices to communication with each other and/or a central workstation or computer via a series of communication links provided by the appendable devices themselves. For example, a particular appendable device may communicate with another appendable device through a series of communications links involving one or more intervening appendable devices. As described in greater detail below, by enabling the appendable devices described herein to function as repeaters, relay stations, etc. appendable devices that are physically very remote from one another can communicate indirectly with each other through other appendable devices, which reduces the amount of power required by each of the appendable devices for transmitting information. Additionally, the communications block 206 may be adapted to determine the best communication path (i.e., series of communication links) to enable communication between any two nodes or devices within a system having a plurality of appendable devices. In the event that the communications block 206 determines that an initially selected communication path has become compromised (i.e., one or more nodes or appendable devices are unable to function as relays or repeaters), the communications block 206 may self-heal communications by determining a new best communication path using only those nodes or devices that are able to function as repeaters or relays.

The control block 208 provides the functionality of a controller and, thus, may be described generally as a virtual controller. Thus, the control block 208 may execute one or more process control loops, may perform various types of data analysis, etc. The events service 212 may process alarm or alert information and generate responsive notifications. The notifications may be conveyed to appropriate entities using email, printed reports, or using any other media or technique. For example, notifications may be sent via wireless media to pagers, cellular phones, hand-held computers, laptops, other workstations or computers, etc.

Figure 4:
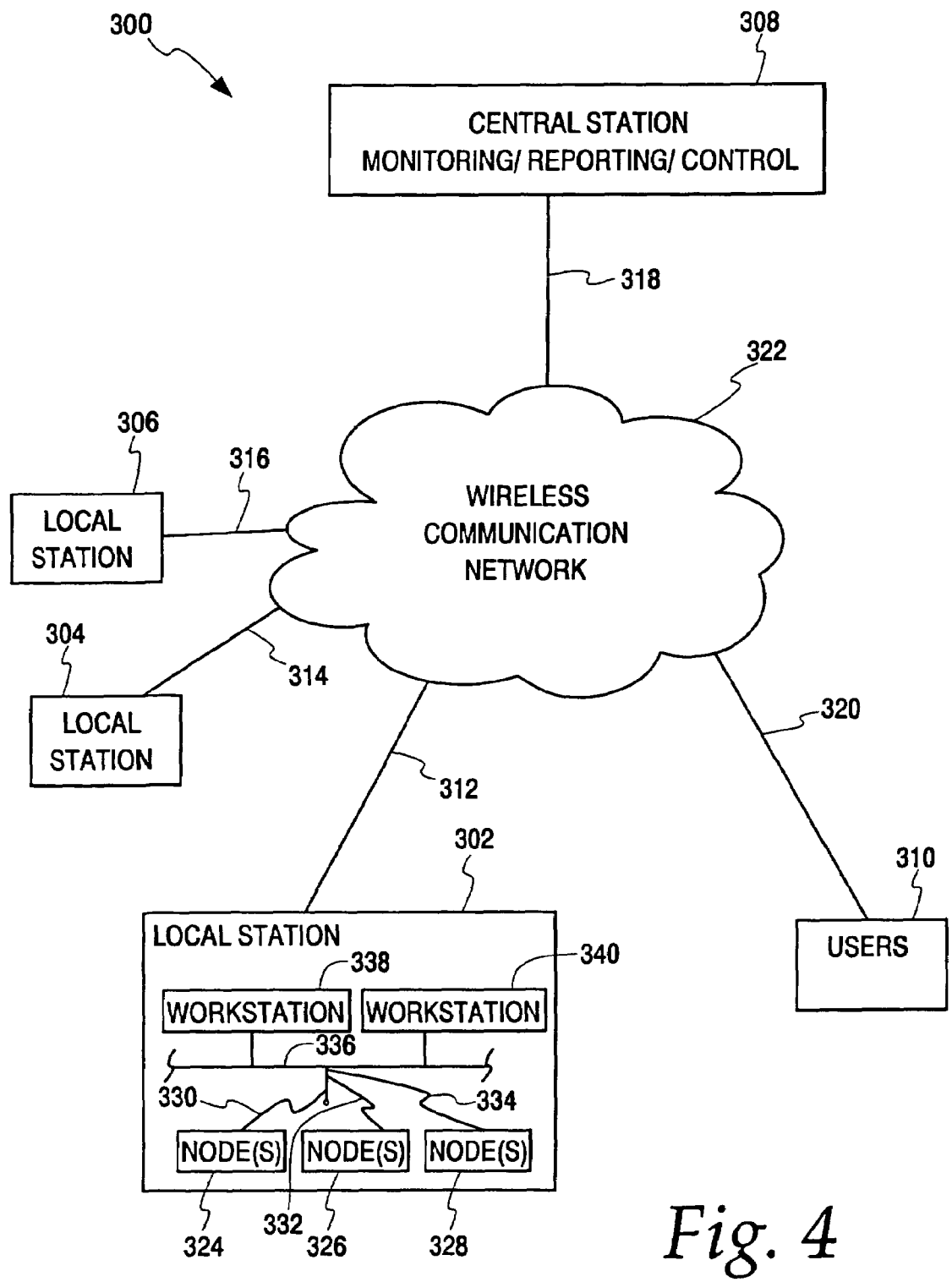
FIG. 4 is a block diagram that depicts an exemplary system topology that may be used to implement a process monitoring and/or control system using the appendable system and devices shown in FIGS. 1-3.

FIG. 4 is a block diagram that depicts an exemplary system topology 300 that may be used in implementing a process monitoring and/or control system using the appendable system and devices described herein. As shown in FIG. 4, the topology 300 includes a plurality of local stations 302, 304 and 306 that are communicatively coupled to a central monitoring, reporting and control station 308 and one or more users 310 via respective wireless communication links 312-320 and a wireless communication network 322.

The local station 302 includes a plurality of nodes or clusters of nodes 324, 326 and 328, each of which is communicatively coupled via respective wireless communication links 330, 332 and 334 to a local area network 336. One or more workstations or other computer systems 338 and 340 may be communicatively coupled to the local area network 336. Each of the nodes 324-328 may include one or more of the appendable devices described herein as well as plant or process equipment, or any other entities, being monitored and/or controlled. Thus, each of the nodes 324-328 may, for example, represent a portion of an overall process control system or plant, a particular geographic region in which monitoring and/or control activities are taking place, etc. The workstations 338 and 340 may be programmed to perform local configuration activities, diagnostic activities, monitoring activities, control activities, etc. Additionally, one or more of the workstations 338 and 340 may be configured to communicate via the wireless communication link 312 to enable the local station 302 to communicate with the other local stations 304 and 306, the central station 308 and/or one or more of the users 310. Although not shown in detail in FIG. 4, the local stations 304 and 306 may be similarly or identically configured to the local station 302.

The wireless communication network 322 may be implemented using any desired technology or combination of technologies. For example, the communication network 322 may use a cellular communications technology that is based on circuit-switched communications and/or packet-switched communications. Alternatively or additionally, the communication network 322 may use the Internet for some or all communications.

The central station 308 may include one or more workstations or other computer systems (not shown) that perform communications routing activities, process monitoring activities, process control activities, reporting activities, etc. In general, the central station 308 may be configured or programmed to coordinate the interactions between the local stations 302-306 and the interactions between the users 310 and the local stations 302-306. Of course, the central station 308 may also coordinate the activities within one or more of the local stations 302-306.

The users 310 may include service technicians, engineers, plant managers, etc. that typically need access to information related to the operations within the local stations 302-306. Additionally, the users 310 may desire to affect the operations (e.g., change a control strategy, parameter, etc.) from a remote location and, thus, the users 310 may communicate with one or more of the local stations 302-306 (either directly through the network 322 and the links 312-316 and 320 or indirectly through the network 322, the central station 308 and the links 312-318 and 320) to effect a change in their operation. The hardware platforms employed by the each of the users 310 may be of any desired type. For example, cellular phones, laptop computers, hand-held computers, pagers, etc. may be used to suit the needs of a particular type of user, the geographic location of the user, etc.

If implemented in software, the functional blocks and software routines discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An appendable controller device for use in a process control system, comprising:
    a housing;
    a memory disposed within the housing;
    an input/output interface disposed within the housing, wherein the input/output interface is adapted to communicate directly via a wired communication connection with at least one of a sensor or a control output operatively coupled to the housing; and
    a processor disposed within the housing and communicatively coupled to the memory, wherein the processor is programmed to communicate with the input/output interface to perform one or more process control functions using the at least one of the sensor or control output.

2. The appendable controller device of claim 1, wherein the processor is further programmed to enable the appendable controller device to perform at least a part of a closed-loop process control algorithm.

3. The appendable controller device of claim 1, further including a wireless transceiver coupled to the processor and adapted to communicate via a wireless communication link.

4. The appendable controller device of claim 3, wherein the processor is further programmed to detect an alarm condition and to send alarm information to another device via the wireless transceiver and the wireless communication link.

5. The appendable controller device of claim 1, further including a power source disposed within the housing.

6. The appendable controller device of claim 5, wherein the power source uses at least one of a capacitor, a battery, a light or a magnetic field to provide power to the processor.

7. The appendable controller device of claim 1, wherein the input/output interface is adapted to communicate directly via a wired communication connection with at least two sensors, or two control outputs or a sensor and a control output.

8. The appendable controller device of claim 1, wherein the process control functions are configured to be implemented with a process control software routine.

9. An appendable communication device for use in a process control system, comprising:
    a housing;
    a plurality of control devices directly coupled to the housing via one or more hardwired communication connections, each of the plurality of control devices comprising one of a sensor adapted to sense a process plant parameter or a control signal line adapted to be connected to the control device to control a process plant parameter; and
    a wireless transceiver disposed within the housing and coupled to a processor and adapted to communicate, via a wireless communication link, one or more sensor signals to another device or to communicate one or more control signals received via the wireless communication link to the one or more control signal lines.

10. The appendable communication device of claim 9, further including a processor programmed to enable the appendable device to perform at least a part of a closed-loop process control algorithm.

11. The appendable communication device of claim 9, further including a processor programmed to detect an alarm condition and to send alarm information to another device via the wireless transceiver.

12. The appendable communication device of claim 9, further including a power source disposed within the housing.

13. The appendable communication device of claim 9, wherein the process plant parameter is configured to be implemented via a process control software routine.

14. An appendable communication device for use in a process control system, comprising:
a housing;
a plurality of sensors disposed within or on the housing, each of the sensors adapted to detect a process plant parameter to produce a sensor signal;
a wireless transceiver disposed within the housing and coupled to the sensors to communicate via a wireless communication link; and
a communications engine adapted to communicate with another device via the wireless transceiver.

15. The appendable communication device of claim 14, further including a processor programmed to detect an alarm condition and to send alarm information to another device via the wireless transceiver.

16. The appendable communication device of claim 14, further including a power source disposed within the housing.

17. The appendable communication device of claim 14, further including a further sensor coupled to the housing via a hardwired communication link.

18. The appendable communication device of claim 14, further including a control signal line coupled to the housing via a hardwired communication connection and adapted to be connected to a control device to provide a control signal to the control device to alter a process plant parameter, and wherein the communications engine is adapted to communicate a control signal received via the wireless transceiver to the control signal line.

19. The appendable communication device of claim 14, further including a processor disposed within the housing and coupled to the wireless transceiver, a control signal line coupled to the processor via a hardwired communication connection and adapted to be connected to a control device to provide a control signal to the control device to alter a process plant parameter, and wherein the processor is programmed to perform at least a part of a closed-loop process control algorithm using one of the sensor signals to produce a control signal to be sent to the control device via the control signal line.

20. The appendable communication device of claim 14, wherein the process plant parameter is configured to be implemented via a process control software routine.

* * * * *

UNITED STATES PATENT AND TRADEMARK OFFICE
CERTIFICATE OF CORRECTION

PATENT NO. : 7,447,612 B2 Page 1 of 1
APPLICATION NO. : 11/361772
DATED : November 4, 2008
INVENTOR(S) : Marion A. Keyes, IV et al.

It is certified that error appears in the above-identified patent and that said Letters Patent is hereby corrected as shown below:

In the Specification:

At Column 9, line 35, "than predetermined" should be -- than a predetermined --.

At Column 11, line 65, "etc." should be -- etc.) --.

At Column 13, line 54, "including," should be -- including --.

At Column 14, line 17, "cooking" should be -- cookie --.

At Column 17, line 33, "or patients" should be -- or more patients --.

Signed and Sealed this

Fifth Day of May, 2009

JOHN DOLL
*Acting Director of the United States Patent and Trademark Office*